Sept. 25, 1962 E. L. WOODS 3,056,118

MAGNETIC MEMORY DEVICE

Filed Dec. 9, 1960 2 Sheets-Sheet 1

INVENTOR
ELVIN L. WOODS
BY HIS ATTORNEYS
HARRIS, KIECH, RUSSELL & KERN

INVENTOR
ELVIN L. WOODS
BY HIS ATTORNEYS
HARRIS, KIECH, RUSSELL & KERN

United States Patent Office
3,056,118
Patented Sept. 25, 1962

3,056,118

MAGNETIC MEMORY DEVICE

Elvin L. Woods, Tustin, Calif., assignor to Ford Motor Company, Dearborn, Mich., a corporation of Delaware Filed Dec. 9, 1960, Ser. No. 74,837
10 Claims. (Cl. 340—174)

This invention relates to memory devices and, in particular, to memory devices from which information can be read nondestructively. The invention also relates to memory devices of the magnetic type into which information can be written and from which information can be read at very high rates.

It is an object of the invention to provide a magnetic memory device into which information may be written at high speeds and from which information may be read nondestructively and at very high speeds. A further object is to provide such a device which may be used with coincident current X—Y select write systems, linear select write systems, and the like. A further object is to provide such a memory device which requires a relatively small amount of energy for interrogation resulting in negligible energy dissipation within the device and much higher permissive reading rates.

It is a particular object of the invention to provide such a memory device in which the binary output is bipolar, i.e., the output is a positive or negative signal rather than a signal and no signal condition, resulting in a much improved signal-to-noise ratio. A further object is to provide such a magnetic device which does not require magnetically hard material to achieve fast switching times while maintaining high signal-to-noise ratio.

It is an object of the invention to provide a memory device for nondestructive reading including a block of magnetic material having first, second and third current axes therethrough parallel to each other, with a first flux zone between the first and second axes and a second flux zone between the second and third axes, and a fourth current axis therethrough perpendicular to the third axis with a third flux zone therebetween, with a first flux path about the first axis, a second flux path about the second axis, a third flux path about the third axis, with the maximum residual flux of the second path about equal to that of the first and third paths, and a fourth flux path about the fourth axis intersecting and perpendicular to the third path in the third zone, first means for generating a flux about the second axis and producing flux switching in the third zone, second means for generating a flux about the first axis and when operated simultaneously with the first means, inhibiting flux switching in the third zone, third means for generating a flux about the fourth axis and producing a reversible flux change in the third zone, and output means for determining flux change occurring about the third axis during operation of the third means. A further object is to provide such a device having apertures through the magnetic material along the respective axes. A further object is to provide such a device including current carrying conductors positioned along the respective axes for generating the magnetic fluxes.

It is an object of the invention to provide a memory device comprising a block of magnetic material having first, second and third openings therethrough parallel and spaced from each other and a fourth opening therethrough perpendicular to and spaced from the third opening, with at least one conductor positioned in each of the openings, means for generating successive current pulses of opposite polarity in the conductor in the second opening, means for generating current pulses in the conductor in the first opening in synchronism with selected pulses in the second opening conductor, means for generating current pulses in the conductor in the fourth opening, and means for determining voltages generated on the conductor in the third opening by the pulses in the fourth opening conductor.

Other objects, advantages, features and results of the invention will more fully appear in the course of the following description. The drawing merely shows and the description merely describes preferred embodiments of the present invention which are given by way of illustration or example.

Figure 1:
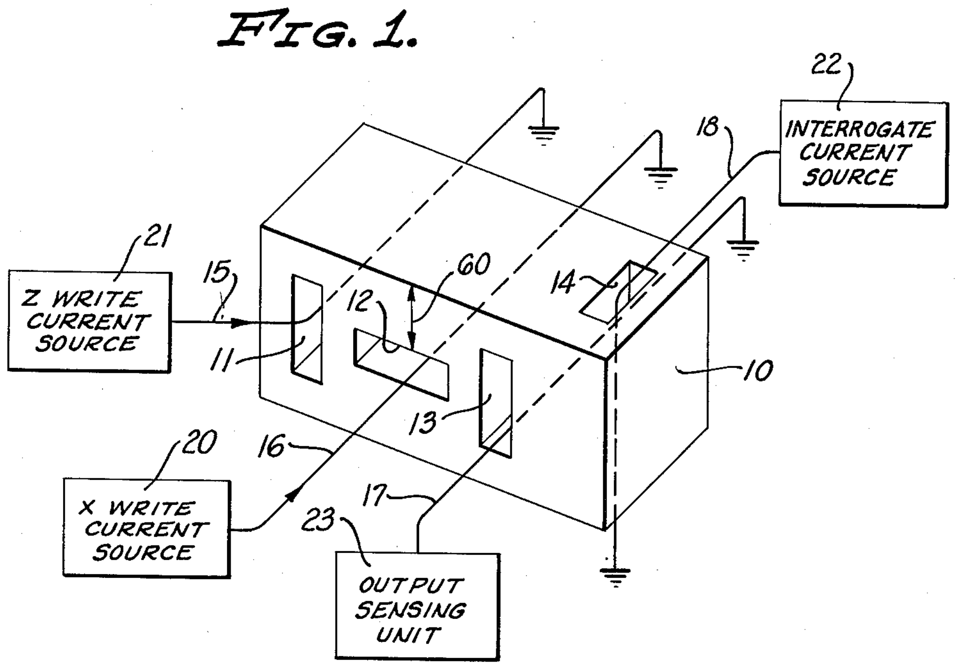
FIG. 1 shows a preferred embodiment of the invention suitable for use in a word oriented linear select array.

Referring to the embodiment of FIG. 1, a block 10 of magnetic material has openings 11, 12, 13 and 14 therethrough. The axes of the openings 11, 12 and 13 are parallel to each other while the axis of the opening 14 is perpendicular to the other three axes. Conductors 15, 16, 17 and 18 are positioned in the openings 11, 12, 13 and 14, respectively. Each conductor is illustrated as a single turn winding but, of course, multiturn windings could be used if desired. A single turn winding requires more current than a multiturn winding to provide the same magnetic flux level but the single turn winding may be operated at a higher rate. Also, single turn windings are ordinarily easier to fabricate.

A current source 20, here identified as the X write current source of the word oriented linear select array, is connected to the conductor 16. Another current source 21, the Z write current source, is connected to the conductor 15. An interrogate current source 22 is connected to the conductor 18. An output sensing unit 23 is connected to the conductor 17.

In the operation of the memory device, it is possible by means of currents through the openings 11 and 12 to switch flux about the opening 13. The polarity of the residual flux condition about the opening 13, i.e., in a positive or negative direction, represents the stored information of the memory device. The status of the residual flux is sensed by interrogate current pulses on the conductor 18 which produce reversible changes in the flux about the opening 13 without destroying the stored information. The flux changes about the opening 13 produce voltages on the conductor 17, either positive or negative, depending upon the stored information. In the example given herein, a stored one will be referred to as a positive flux and a positive voltage pulse on the conductor 17 will represent an output one. A negative flux will correspond to a stored zero and a negative voltage pulse will correspond to a zero output.

Figure 3:
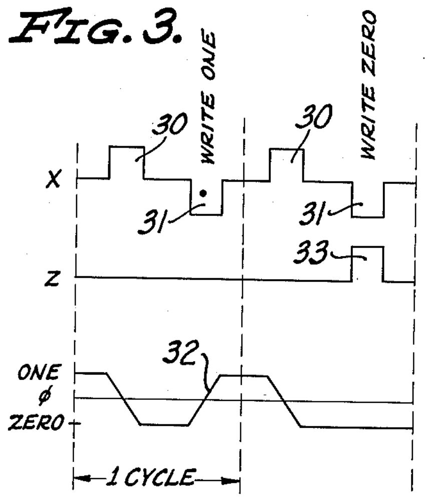
FIG. 3 illustrates the writing operation for the embodiment of FIG. 1.

FIG. 3 illustrates the current and flux condition for writing or storing ones and zeros in the memory device of FIG. 1. Successive current pulses 30, 31 of opposite polarity are supplied to the conductor 16 by the current source 20. The current pulse 30 produces a clockwise or negative flux along the path about the opening 12 and also along the path which encloses the three openings 11, 12 and 13. The flux $\phi$ in the zone between the perpendicular openings 13, 14 is indicated in FIG. 3. In writing a one, the current pulse 31 produces a counterclockwise flux about the opening 12 and about the three openings, causing flux switching in the zone between the perpendicular openings, as indicated by the change in $\phi$ from a stored zero to a stored one at 32 of FIG. 3.

The second write cycle of FIG. 3 illustrates the writing or storing of a zero into the memory device. The current pulse 30 produces a negative flux in the zone between the perpendicular openings. During the existence of the current pulse 31, the current source 15 produces a current pulse 33 on the conductor 15 of opposite polarity. The current pulse 31 tends to produce a counterclockwise flux about the opening 12 as in the writing of a one in the previously described cycle. However, the current pulse 33 inhibits the flux switching which previously occurred in the zone between the perpendicular openings. Hence, a negative flux or zero is stored in the memory device.

Figure 5:
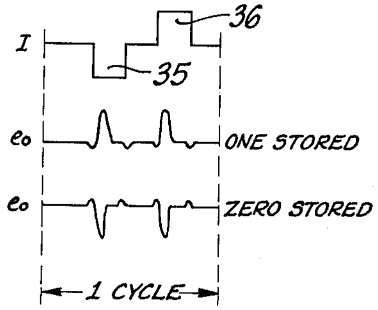
FIG. 5 illustrates the two-pulse interrogation operation.

Two modes of interrogating the memory device are described herein. Consider first the two-pulse interrogate sequence of FIG. 5. The interogate current source 22 produces successive current pulses 35, 36 of opposite polarity on the conductor 18. Each pulse causes a reversal of the residual flux about the opening 14; these flux changes also cause reversible flux changes in the path about the opening 13. However, the polarity of the flux change about the opening 13 and, hence, the polarity of the voltage generated on the conductor 17 is a function only of the residual flux state about the opening 13 and is independent of the polarity of the current pulse on the interrogate conductor 18. Hence, each of the current pulses 35, 36 produces a positive output on the conductor 17 for a stored one and a negative output on the conductor 17 for a stored zero, as indicated in FIG. 5. It is not necessary that the current pulses 35, 36 have the same magnitude and duration but only that each produce some flux reversal. It is desirable that one of the pulses be of sufficient amplitude and waveform to produce a rapid flux change to generate a relatively large voltage pulse on the output conductor 17.

Figure 6:
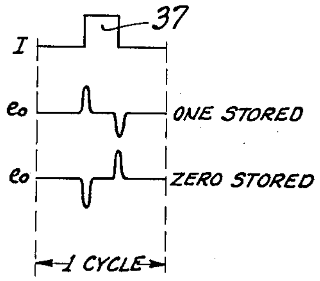
FIG. 6 illustrates the single pulse interrogation operation.

The single pulse interrogate mode of FIG. 6 does not rely upon residual flux switching about opening 14 and, hence, may be operated with much lower energy inputs and at much higher rates. However, the resultant output voltage is lower than for the two-pulse system of FIG. 5. In the single pulse system, a single current pulse 37 is supplied to the interrogate conductor 18 by the current source 22. This pulse may be of either polarity since the output on the output conductor 17 is a function of the polarity of the flux about the opening 13. The initial rise of the current pulse 37 produces a temporary domain rotation of the magnetic material and a corresponding voltage pulse on the output conductor. The final decay of the pulse allows this temporary domain rotation to reverse with a corresponding output voltage pulse of the opposite polarity. As there is no irreversible flux switching involved, very little energy is required for this mode of interrogation and negligible core heating occurs even at extreme interrogation rates.

The switching speed and, hence, the writing time of the memory device may be reduced by providing a D.C. bias current to produce a bias flux about the opening 11. In the device of FIG. 1, the bias current can be provided on the conductor 15 by the current source 21 or by a separate current source, or a separate conductor can be utilized with a separate current source. The embodiment of FIG. 2 shows an X—Y coincident current write device with the Z or inhibit current and the bias current on a single conductor.

Figure 2:
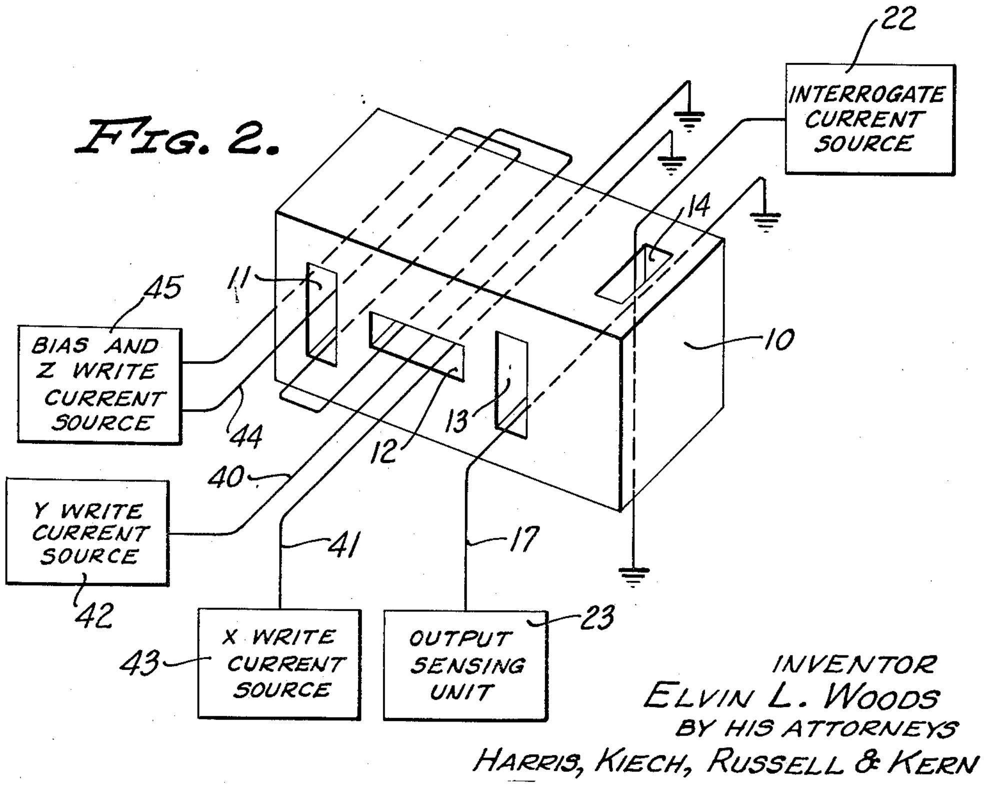
FIG. 2 shows an alternative embodiment of the invention suitable for use in an X—Y coincident current array.

In the device of FIG. 2, components identical to those of FIG. 1 are identified by the same reference numerals. Conductors 40, 41 are positioned in the opening 12. A current source 42 is connected to the conductor 40 and a current source 43 is connected to the conductor 41. A conductor 44 is passed through the opening 11 and loops back through the opening 12 with a current source 45 connected thereto. This looped conductor places a one-turn winding through opening 12 and a two-turn winding through opening 11.

Figure 4:
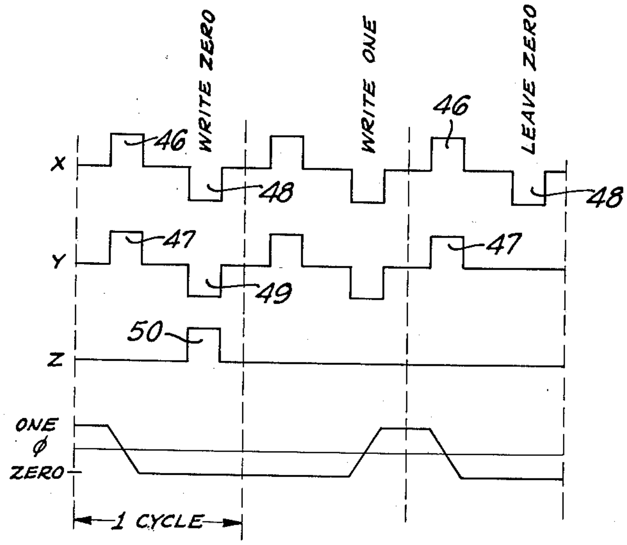
FIG. 4 illustrates the writing operation for the embodiment of FIG. 2.

The writing operation for the embodiment of FIG. 2 is substantially the same as that of FIG. 1 and is illustrated in FIG. 4. The magnitude and duration of the current pulses on the conductors 40, 41 are limited with respect to the bias current such that a pulse on one conductor only will not produce flux switching. Hence, there must be coincidence in the occurrence of pulses on the two conductors to write information into the memory. In the first cycle of FIG. 4, coincident pulses 46, 47 produce flux switching from the stored one to the stored zero state. The flux switching which normally would be produced by the coincident pulses 48, 49 is inhibited by the current pulse 50 on the conductor 44. In the second cycle, there is no inhibit pulse and a one is written into the memory. In the third cycle, there is no pulse on the Y conductor 40 coincident with the pulse 48 on the X conductor and the flux status produced by the preceding coincident pulses 46, 47 is retained.

In the memory device of the invention, the material from which the block 10 is formed does not have to be magnetically hard to achieve fast switching times. A very soft ferrite material can be used even though having a relatively low squareness ratio ($Br/Bm$). While relatively low squareness ratios result in poor signal-to-noise ratios in ordinary magnetic devices, the device of the present invention is not seriously affected since a bipolar output is provided.

The geometry of the block 10 is not critical to the operation of the memory device and the openings may have any shape. However, the limiting cross-sectional area of the magnetic flux path about the opening 12 should be about two times the limiting cross-sectional area of the flux path about the opening 11 and of the flux path about the opening 13. Then the maximum residual flux of the second path is about equal to that of the first and third paths. Stated differently, it is preferred to have the minimum cross-sectional area of that portion of the path about the opening 12 which is not common with the path about the opening 11 and the path about the opening 13, i.e., the portion indicated at 60 of FIG. 1, twice the minimum cross-sectional area of the path about the opening 11.

In the use of memory devices, it is found that a memory is often interrogated two to five times for each time information is stored in the memory. Using the conventional destructive readout, information must be written into the memory following each read operation. With the nondestructive read feature of the present device, the memory may be interrogated any number of times without requiring writing. Hence, the duty cycle or energy dissipation is considerably reduced.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a memory device for nondestructive reading, the combination of: a block of magnetic material having bistable remanent states, said block having first, second and third current axes therethrough parallel to each other, with a first flux zone between the first and second axes and a second flux zone between the second and third axes, and a fourth current axis therethrough perpendicular to said third axis with a third flux zone therebetween, and including a first flux path about said first axis, a second flux path about said second axis, a third flux path about said third axis, with the maximum residual flux of said second path about equal to that of said first and third paths, and a fourth flux path about said fourth axis intersecting and perpendicular to said third path in said third zone; first means for generating a flux about said second axis and producing flux switching in said third zone; second means for generating a flux about said first axis and when operated simultaneously with said first means, inhibiting flux switching in said third zone; third means for generating a flux about said fourth axis and producing a reversible flux change in said third zone; and output means for determining flux change occurring about said third axis during operation of said third means.

2. In a memory device for nondestructive reading, the combination of: a block of magnetic material having bistable remanent states, said block having first, second and third openings therethrough parallel to each other, with a first flux zone between the first and second openings and a second flux zone between the second and third openings, and a fourth opening therethrough perpendicular to said third opening with a third flux zone therebetween, and including a first flux path about said first opening, a second flux path about said second opening, a third flux path about said third opening, with the maximum residual flux of said second path about equal to that of said first and third paths, and a fourth flux path about said fourth opening intersecting and perpendicular to said third path in said third zone; first means for generating a flux about said second opening and producing flux switching in said third zone; second means for generating a flux about said first opening and when operated simultaneously with said first means, inhibiting flux switching in said third zone; third means for generating a flux about said fourth opening and producing reversible flux change in said third zone; and output means for determining flux change occurring about said third opening during operation of said third means.

3. In a memory device for nondestructive reading, the combination of: a block of magnetic material having bistable remanent states, said block having first, second and third openings therethrough parallel to each other, with a first flux zone between the first and second openings and a second flux zone between the second and third openings, and a fourth opening therethrough perpendicular to said third opening with a third flux zone therebetween, and including a first flux path about said first opening, a second flux path about said second opening, a third flux path about said third opening, with the minimum cross-sectional area of that portion of said second path joining said first and second zones about twice the minimum cross-sectional area of said first path, and a fourth flux path about said fourth opening intersecting and perpendicular to said third path in said third zone; at least one conductor positioned in said second opening for generating a flux about said second opening and producing flux switching in said third zone; at least one conductor positioned in said first opening for generating a flux about said first opening and when energized simultaneously with the conductor in said second opening, inhibiting flux switching in said third zone; at least one conductor positioned in said fourth opening for generating a flux about said fourth opening and producing flux change in said third zone; and a conductor positioned in said third opening for determining flux change occurring about said third opening during energization of the conductor in said fourth opening.

4. In a memory device for nondestructive reading, the combination of: a block of magnetic material having bistable remanent states, said block having first, second and third openings therethrough parallel to and spaced from each other, and a fourth opening therethrough perpendicular to and spaced from said third opening; at least one conductor positioned in each of said openings; means for generating successive current pulses of opposite polarity in the conductor in said second opening; means for generating current pulses in the conductor in said first opening in synchronism with selected pulses in said second opening conductor; means for generating current pulses in the conductor in said fourth opening; and means for determining voltages generated on the conductor in said third opening by the pulses in said fourth opening conductor.

5. In a memory device for nondestructive reading, the combination of: a block of magnetic material having bistable remanent states, said block having first, second and third openings therethrough parallel to and spaced from each other, and a fourth opening therethrough perpendicular to and spaced from said third opening; at least one conductor positioned in each of said openings; means for generating successive current pulses of opposite polarity in the conductor in said second opening; means for generating current pulses in the conductor in said first opening in synchronism with selected pulses in said second opening conductor; means for generating successive current pulses of opposite polarity in the conductor in said fourth opening and of a magnitude and duration to produce flux reversal about said fourth opening; and means for determining voltages generated on the conductor in said third opening by the flux change about said fourth opening.

6. In a memory device for nondestructive reading, the combination of: a block of magnetic material having bistable remanent states, said block having first, second and third openings therethrough parallel to and spaced from each other, and a fourth opening therethrough perpendicular to and spaced from said third opening; at least one conductor positioned in each of said openings; means for generating successive current pulses of opposite polarity in the conductor in said second opening; means for generating current pulses in the conductor in said first opening in synchronism with selected pulses in said second opening conductor; means for generating a current pulse in the conductor in said fourth opening of a magnitude and duration to produce flux domain rotation about said fourth opening; and means for determining voltages generated on the conductor in said third opening by the flux change about said fourth opening.

7. In a memory device for nondestructive reading, the combination of: a block of magnetic material having bistable remanent states, said block having first, second and third openings therethrough parallel to and spaced from each other, and a fourth opening therethrough perpendicular to and spaced from said third opening; first and second conductors positioned in said second opening; at least one conductor positioned in each of said other openings; means for generating current pulses in said first conductor; means for generating current pulses in said second conductor, with coincidence of pulses in said first and second conductors producing flux switching about said third opening; means for generating current pulses in the conductor in said first opening in synchronism with selected pulses in said first and second conductors and inhibiting flux switching about said third opening; means for generating current pulses in the conductor in said fourth opening; and means for determining voltages generated on the conductor in said third opening by the pulses in said fourth opening conductor.

8. In a memory device for nondestructive reading, the combination of: a block of magnetic material having bistable remanent states, said block having first, second and third openings therethrough parallel to and spaced from each other, and a fourth opening therethrough perpendicular to and spaced from said third opening; first and second conductors positioned in said second opening; a third conductor positioned in said first opening and looped back through said second opening; at least one conductor positioned in each of said other openings; means for generating current pulses in said first conductor; means for generating current pulses in said second conductor, with coincidence of pulses in said first and second conductors producing flux switching about said third opening; means for generating a D.C. current in said third conductor and for generating current pulses in said third conductor in synchronism with selected pulses in said first and second conductors and inhibiting flux switching about said third opening; means for generating current pulses in the conductor in said fourth opening; and means for determining voltages generated on the conductor in said third opening by the pulses in said fourth opening conductor.

9. In a memory device for nondestructive reading, the combination of: a block of magnetic material having bistable remanent states, said block having first, second and third openings therethrough parallel to and spaced from each other, and a fourth opening therethrough perpendicular to and spaced from said third opening; at least one conductor positioned in each of said openings; means for generating successive current pulses of opposite polarity in the conductor in said second opening; means for generating a steady state current in the conductor in said first opening and for generating current pulses in the first opening conductor in synchronism with selected pulses in said second opening conductor; means for generating current pulses in the conductor in said fourth opening; and means for determining voltages generated on the conductor in said third opening by the pulses in said fourth opening conductor.

10. In a memory device for nondestructive reading, the combination of: a block of magnetic material having bistable remanent states, said block having first, second and third openings therethrough parallel to and spaced from each other, and a fourth opening therethrough perpendicular to and spaced from said third opening, with the minimum cross-sectional area of the magnetic material in the unshared portion of the flux path about said second opening about twice the minimum cross-sectional area of the magnetic material in the flux path about said first opening; at least one conductor positioned in each of said openings; means for generating successive current pulses of opposite polarity in the conductor in said second opening; means for generating current pulses in the conductor in said first opening in synchronism with selected pulses in said second opening conductor; means for generating current pulses in the conductor in said fourth opening; and means for determining voltages generated on the conductor in said third opening by the pulses in said fourth opening conductor.

References Cited in the file of this patent

UNITED STATES PATENTS

| | | |
|---|---|---|
| 2,923,923 | Raker | Feb. 2, 1960 |
| 2,926,342 | Rogers | Feb. 23, 1960 |

OTHER REFERENCES

Publication: "Device Uses Orthogonal Magnetic Fields for Nondestructive Readout" from Electronic Design, Aug. 5, 1959. References found in 340–174, pub. 121, pp. 28–31.